UNITED STATES PATENT OFFICE.

HEINRICH REINHARDT, OF BIEBRICH, GERMANY, ASSIGNOR TO KALLE & CO., OF SAME PLACE.

OREXIN TANNATE AND PROCESS OF MAKING SAME.

SPECIFICATION forming part of Letters Patent No. 615,307, dated December 6, 1898.

Application filed January 4, 1898. Serial No. 665,573. (No specimens.)

*To all whom it may concern:*

Be it known that I, HEINRICH REINHARDT, doctor of philosophy, a subject of the Grand Duke of Hesse, residing at Biebrich, Germany, (assignor to KALLE & Co., of Biebrich-on-the-Rhine, Germany,) have invented certain new and useful Improvements in the Manufacture of Orexin Tannate, of which the following is a specification.

This invention relates to the preparation of a tannic-acid salt of the dihydrophenyl-quinazolin, which latter body is known under the name of "orexin base." This tannic-acid salt of the dihydrophenyl-quinazolin, which in the following I shall call "orexin tannate," is a very valuable remedy.

In carrying out my invention I proceed, for instance, as follows: I dissolve two hundred and fifty grams orexin hydrochlorate in four liters of water at a temperature of 40° to 45° centigrade, mix with a solution of three hundred and seventy-five grams of tannin in three liters of water having the same temperature, and precipitate under good agitation by adding a solution of one hundred and forty-one grams of crystallized sodium acetate in three liters of water, also of a temperature of 40° to 45° centigrade. I now filter, wash with distilled water until the filtrate is free of chlorin, and press and dry at a temperature of 40° to 45° centigrade. The so-obtained orexin tannate is a white or slightly-yellow colored powder, which is tasteless and odorless. It is insoluble in water and easily soluble in dilute hydrochloric acid. Caustic alkalies and alkali carbonates do not dissolve the new product, but, especially on heating, they decompose it under brown coloration.

Now what I claim is—

1. The new process of preparing orexin tannate by mixing an aqueous solution of orexin hydrochlorate with an aqueous solution of tannin at a temperature of 40° to 45° centigrade, precipitating the obtained mixture by adding an aqueous solution of sodium acetate at the same temperature, filtering, washing, pressing and drying substantially as described.

2. As a new product the orexin tannate herein described, which consists of a white or slightly-yellow powder, which is odorless and tasteless, insoluble in water, easily soluble in dilute hydrochloric acid, which is not dissolved by caustic alkalies or alkali carbonates, and which is decomposed by these reagents, especially on heating, under brown coloration.

In testimony whereof I have signed my name to this specification in the presence of two subscribing witnesses.

HEINRICH REINHARDT.

Witnesses:
WALTER HAUSING,
HEINRICH MISCHLER.